United States Patent Office 2,772,619
Patented Dec. 4, 1956

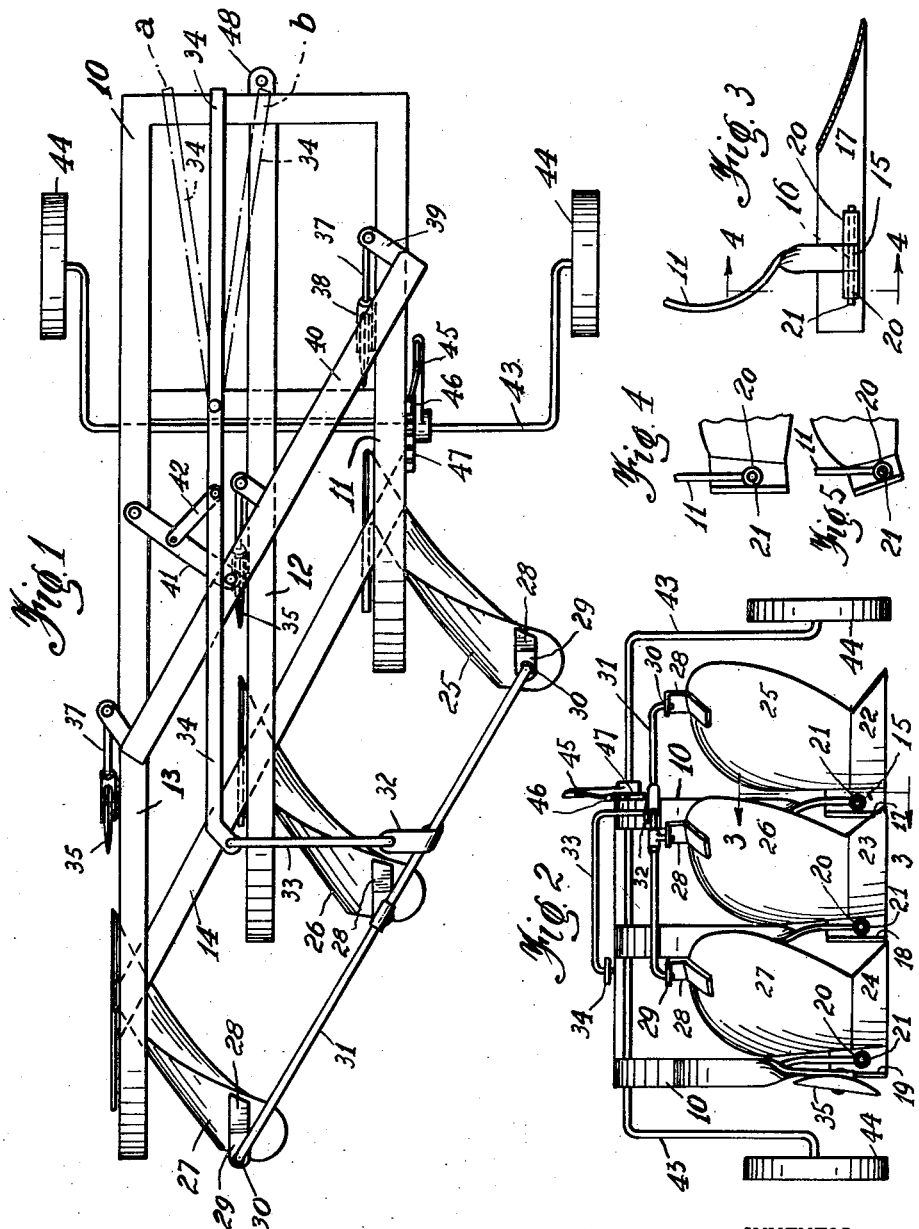

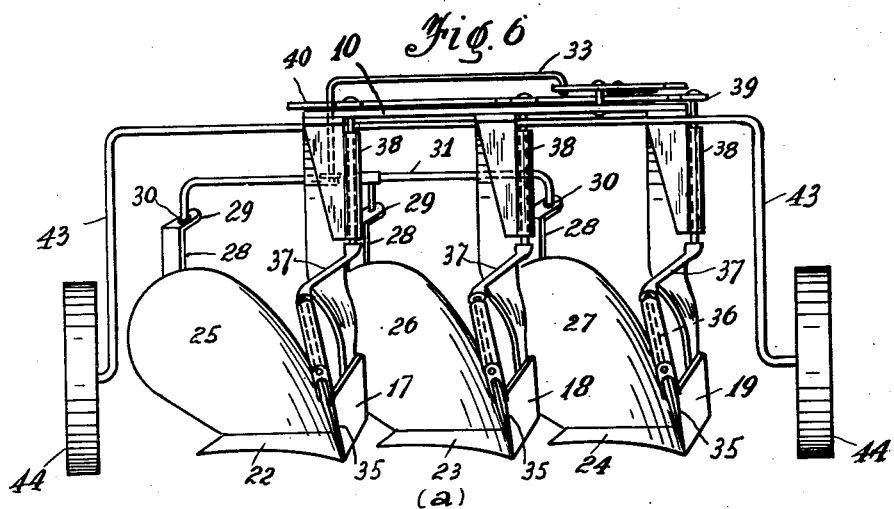
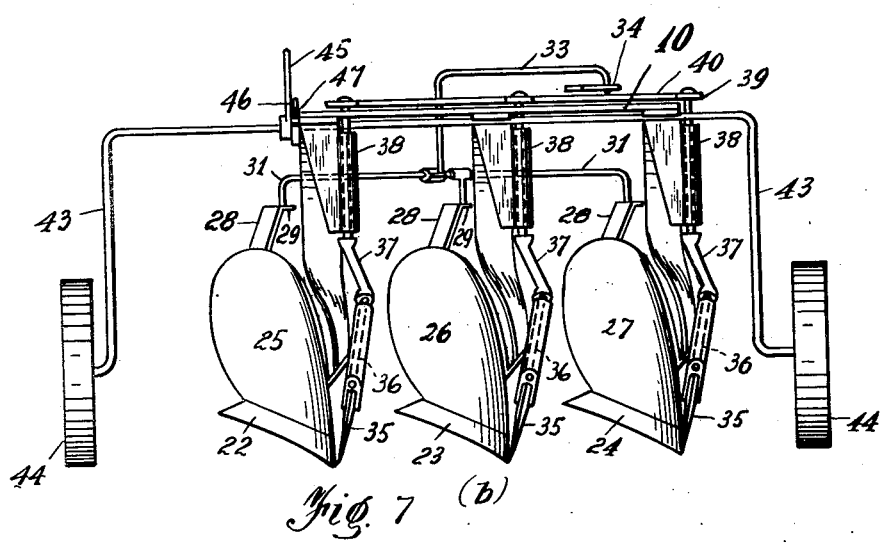

2,772,619

GANG PLOWS

Edward N. Benefiel, Warren, Ohio, and Watson G. Pfouts, Pittsburgh, Pa.

Application September 3, 1953, Serial No. 378,274

3 Claims. (Cl. 97—93)

This invention relates to plows and particularly to an improvement in gang plows, and is an improvement over Patent No. 2,287,017.

Plows such as have been heretofore used have been fixed on a framework and movable only in the up and down vertical direction. Such plows are difficult to use in uneven or hilly country and do not do a satisfactory job of plowing. Moreover, there is no way to alter positions of the plowshare whereby the natural draft of the the plow may be varied.

An object of the present invention is to provide a gang plow construction wherein the plows are pivotable relatively to the framework to vary the horizontal position of the plow share.

Another object of this invention is to provide a gang plow construction wherein the plows are mounted for pivotal movement about a horizontal axis whereby the plows may be adjusted so that the landside of the plows will maintain a vertical position relatively to the horizontal regardless of the slope of the surface being plowed.

A further object of this invention is to provide a gang plow construction wherein all of the plows are simultaneously adjusted about separate parallel axes so that the landside of each plow is in a vertical position relative to a horizontal plane regardless of the slope of the surface being plowed.

Another object is to provide a gang plow construction in which the furrows may be maintained at substantially constant depth regardless of the slope of the surface.

Another object is to provide a gang plow construction in which the natural draft of the plow may be varied to cause the plow to "dig in" or "dig out" at the choice of the operator.

Other objects and advantages of the invention will become apparent from a consideration of the following description and the accompanying drawings in which:

Figure 1 is a top plan view of a gang plow according to this invention.

Figure 2 is a rear elevation of the gang plow of Figure 1.

Figure 3 is a fragmentary section on the line 3—3 of Figure 2.

Figure 4 is a fragmentary section on the line 4—4 of Figure 3.

Figure 5 is a section similar to that of Figure 4 showing the landside rotated about a horizontal axis.

Figure 6 is a front elevation of the gang plow of Figure 1.

Figure 7 is a front elevation similar to that of Figure 6 with the plows and coulters located angularly from the position of Figure 6.

Referring to the drawings there is illustrated a plow frame 10 formed in part by plow beams 11, 12 and 13 varying stepwise in length. A brace member 14 extends across the beams 11, 12 and 13 to hold them in spaced apart, substantially parallel relationship. The free end of each of the plow beams 11, 12 and 13 is provided with an enlarged portion 15 carrying a bore 16 substantially parallel to the length of the beam carrying it. Landsides 17, 18 and 19 are provided with hinge eyes 20 which lie on opposite ends of the bore 16 in the plow beams and are rotatable with respect thereto on a hinge pin 21. Plow shares 22, 23 and 24 and moldboards 25, 26 and 27 are attached to the landsides to form conventional plow bottoms.

A vertically extending tongue 28 having a horizontal flange 29 provided with an opening 30 therein is fixed to the rear of each moldboard adjacent the top edge thereof and projecting above the edge. A connecting arm 31 is hinged in each of the openings 30 to move all of the moldboards 25, 26 and 27 simultaneously and to the same amount. The connecting arm 31 is provided with a crank arm 32 which is connected through a crank rod 33 to one end of a control arm 34 pivoted on the frame 10. The opposite end of the control arm 34 extends forward of the frame whereby the operator by moving it can control the position of the plow bottom on the plow beams.

Coulters 35 may be provided in front of each plow bottom to cut any surface sod or trash in order to make a clear furrow, each coulter is rotatable mounted on a shaft 36 pivoted in one end of a crank arm 37 which is in turn pivoted in a sleeve 38 on the frame 10. The opposite end of the crank arm 37 is pivoted in a tongue 39 on a connecting rod 40 movable across the top of the frame and connecting all of the crank arms 37. A lever 41 pivoted at one end on the frame 10 is pivotally connected to the connecting rod 40 intermediate its ends. A connecting rod 42 connects the lever 41 with the control arm 34. Movement of the control arm 34 to change the position of the plow bottom simultaneously actuates the lever 41 and the connecting rod 40 thereby rotating the crank arms 37 in the sleeve 38. Rotation of the crank arms 37 causes the coulters 35 to shift their position following the leading edge of the share and moldboard.

In a preferred form of this invention there is provided a U-shaped axle 43 rotatably journaled on the frame 10 transversely of the plow beams 11, 12 and 13. Each of the legs of the axle extends downwardly from the frame and is bent outwardly to carry a wheel 44. The position of the wheels with respect to the frame and thereby the raising and lowering of the plows is controlled by a handle 45 fixed to the axle and provided with a spring loaded latch 46 which engages a segmented toothed quadrant 47 on the frame.

A drawbar 48 is provided on the frame 10 for attachment to a tractor or the like. Other well known types of hitch may be substituted for this drawbar.

In Figures 6 and 7 there are illustrated the two extreme positions of the plow bottoms and coulters with respect to the frame corresponding to the positions (a) and (b) of the control arm 34 shown in dotted lines on Figure 1. Obviously any of a large number of intermediate positions could be obtained by simple adjustment of the control arm 34.

While there is illustrated and described herein a preferred embodiment of the invention it will be understood that it may be otherwise embodied within the scope of the following claims.

We claim:

1. In a gang plow, a frame, plow beams on the frame having depending curved portions, a landside pivoted on each depending portion below the main portion of the plow beam, a plow share and moldboard fixed to each landside and pivoted therewith, a first connecting rod extending transversely across the top of each moldboard and pivotally connected therewith, lever means pivoted on the frame, link means connecting the lever means and the first connecting rod and moving the connecting rod transversely across the top of the moldboards whereby the moldboards and the landsides are pivoted about the ends of the beams on axes parallel to the landsides, crank means pivoted on each plow beam in advance of the depending portion for movement about a vertical axis, coulter means rotatably mounted on one end of each said crank means, a second connecting rod connecting the opposite ends of said crank means and extending generally parallel to the first connecting rod and means connecting said second connecting rod to the lever means intermediate its pivot on the frame and its connection with the first connecting rod whereby the second connecting rod moves simultaneously with the first connecting rod in fixed proportion thereto and in the same direction to rotate the crank means about its vertical axis and simultaneously to move the coulters to a position in front of the cutting edge of the plow shares.

2. In a gang plow as claimed in claim 1 wherein the means connecting the second connecting rod and the lever means comprises an arm pivoted at one end on the connecting rod and at the other end to the plow frame and a link connecting this said arm intermediate its ends to the lever means.

3. In a gang plow construction, a frame, plow beams on the frame having depending curved portions, a horizontal bore on each depending portion below and substantially parallel to the main portion of the beams, a pin in said bore, a landside pivoted on said pin, a plowshare and moldboard fixed to said landside and pivotal therewith, a rod extending transversely across the top of each moldboard, means pivotally connecting the top edge of each moldboard with said rod, lever means pivoted on the frame, link means connecting the lever means and the connecting rod and moving the connecting rod transversely across the top of the moldboards whereby the moldboards and landsides are pivoted in unison about the pins in the depending ends of the plow beams, a vertical sleeve on each plow beam in advance of the depending portion, a crank arm rotatably mounted in each of said sleeves, coulter means rotatably mounted on one end of each crank arm, a second connecting rod connecting the ends of the crank arms opposite the coulters and extending generally transversely of the beams and parallel to the first connecting rod on the moldboards and means connecting the second connecting rod to the lever means whereby the said second rod moves simultaneously and proportionally to the connecting rod on the moldboards to rotate the crank arms in the vertical sleeves a proportional amount sufficient to maintain the coulters in a position in front of the cutting edge of the plow shares.

References Cited in the file of this patent

UNITED STATES PATENTS

| | | |
|---|---|---|
| 1,014,379 | Danielsen | Jan. 9, 1912 |
| 1,822,920 | Burman | Sept. 15, 1931 |
| 2,287,017 | Benefiel | June 23, 1942 |
| 2,326,097 | Horner et al. | Aug. 3, 1943 |